(12) United States Patent
Du et al.

(10) Patent No.: US 12,306,293 B1
(45) Date of Patent: May 20, 2025

(54) METHOD AND SYSTEM FOR EVALUATING POST-EARTHQUAKE DAMAGE OF BUILDING GROUPS BASED ON InSAR

(71) Applicant: Southeast University, Jiangsu (CN)

(72) Inventors: Yanan Du, Jiangsu (CN); Decheng Feng, Jiangsu (CN); Gang Wu, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 18/940,840

(22) Filed: Nov. 8, 2024

(30) Foreign Application Priority Data

Nov. 10, 2023 (CN) .......................... 202311492006.0

(51) Int. Cl.
*G01S 13/90* (2006.01)
*G06T 7/11* (2017.01)
(Continued)

(52) U.S. Cl.
CPC ............ *G01S 13/9023* (2013.01); *G06T 7/11* (2017.01); *G06T 7/521* (2017.01); *G06T 7/55* (2017.01);
(Continued)

(58) Field of Classification Search
CPC ....... G01S 13/9023; G06T 7/55; G06T 7/521; G06T 7/11; G06T 17/05;
(Continued)

(56) References Cited

U.S. PATENT DOCUMENTS 9,014,415 B2 * 4/2015 Chen ..................... G06T 7/0002
382/100
9,036,861 B2 * 5/2015 Chen ..................... G06T 7/0002
382/100
(Continued)

FOREIGN PATENT DOCUMENTS

CN 108416760 A * 8/2018 ......... G06K 9/00637
WO WO-2022214114 A2 * 10/2022 ............. G01B 15/06

OTHER PUBLICATIONS

Wang, Zhiyi et al., "Application of the high resolution optical and SAR remote sensing data images induced by the Jiuzhaigou M7.0 earthquake geological hazards survey", The Chinese Journal of Geological Hazard and Control, vol. 29, No. 5, Oct. 15, 2018, with English translation thereof, pp. 1-16.
(Continued)

*Primary Examiner* — Nuzhat Pervin
(74) *Attorney, Agent, or Firm* — JCIPRNET (57) ABSTRACT

The present invention discloses a method and system for evaluating post-earthquake damage of building groups based on interferometric synthetic aperture radar (InSAR). Method includes: determining an investigation region, acquiring pre- and post-earthquake radar images of a corresponding district, and acquiring radar datasets included in radar images; acquiring a radar line-of-sight (LOS)-direction deformation map of investigation region by processing pre- and post-earthquake radar images using D-InSAR; acquiring a deformation in a main earthquake direction by decomposing an LOS-direction deformation; drawing a
(Continued)

deformation classification map of buildings; acquiring pre- and post-earthquake optical remote sensing images of investigation region, and locating post-earthquake collapsed buildings; locating collapsed buildings in deformation classification map, comparing optical remote sensing images with deformation classification map, and locating exact positions of collapsed buildings; and evaluating post-earthquake damage of the buildings by evaluating post-earthquake damage conditions based on position information of collapsed buildings and the deformation classification map.

8 Claims, 5 Drawing Sheets

(51) Int. Cl.
G06T 7/521 (2017.01)
G06T 7/55 (2017.01)
G06T 17/05 (2011.01)
G06V 20/10 (2022.01)
G06V 20/17 (2022.01)
G06V 20/50 (2022.01)

(52) U.S. Cl.
CPC ............ *G06T 17/05* (2013.01); *G06V 20/17* (2022.01); *G06V 20/176* (2022.01); *G06V 20/50* (2022.01); *G06T 2207/10044* (2013.01)

(58) Field of Classification Search
CPC ......... G06T 2207/10044; G06V 20/17; G06V 20/176; G06V 20/50

USPC ...................................................... 342/25 C
See application file for complete search history.

(56) References Cited

U.S. PATENT DOCUMENTS

| 10,182,212 | B2* | 1/2019 | Coulter | H04N 7/181 |
| 11,461,964 | B2* | 10/2022 | Pennings | G06T 17/00 |
| 12,055,624 | B2* | 8/2024 | Ma | G06T 7/13 |
| 2012/0319893 | A1* | 12/2012 | Yun | G01S 13/9023 342/25 C |
| 2013/0226624 | A1* | 8/2013 | Blessman | H04N 7/181 705/4 |
| 2020/0394780 | A1* | 12/2020 | Sowter | G01S 13/9027 |

OTHER PUBLICATIONS

Wang, Xiaoqing et al., "Primary Quantitative Study on Earthquake Damage Extracted from Remote Sensing Imagery—A Case Study of Doujiangyan due to the Wenchuan M8. 0 Earthquake", Earthquake, vol. 29, No. 1, Jan. 15, 2009, with English translation thereof, pp. 1-16.

Wang, Yanyan et al., "Extraction of 3D coseismic deformation field of Jiuzhaigou Ms 7. 0 earthquake", Science of Surveying and Mapping, vol. 44, Na. 5, Apr. 9, 2018, with English translation thereof, pp. 1-12.

* cited by examiner

METHOD AND SYSTEM FOR EVALUATING POST-EARTHQUAKE DAMAGE OF BUILDING GROUPS BASED ON InSAR

CROSS-REFERENCE TO RELATED APPLICATION

This application claims the priority benefit of China application serial no. 202311492006.0, filed on Nov. 10, 2023. The entirety of the above-mentioned patent application is hereby incorporated by reference herein and made a part of this specification.

TECHNICAL FIELD

The present invention relates to the technical field of post-earthquake damage evaluation of buildings, and in particular to a method and system for evaluating post-earthquake damage of building groups based on InSAR.

RELATED ART

Earthquakes caused a significant loss of life and extensive damage to buildings, and gave rise to secondary disasters, leaving the affected population and their properties in serious difficulties. Timely acquisition of disaster information and evaluation of resulting damage are crucial for reducing the impacts of earthquakes.

Interferometric synthetic aperture radar (InSAR) is an important remote sensing method that has emerged since the 20th century. It has advantages such as large coverage, all-weather availability and capability of collecting high-precision earth surface information, exhibiting a precious value for geological hazard investigation. InSAR can achieve millimeter-level accuracy, regardless of the constraints of weather conditions and time, by capturing radar line-of-sight (LOS) deformation information over a broad region within two imaging cycles. It has proved that InSAR has achieved successes in monitoring the processes of large-scale spatiotemporal earth surface deformations, including landslides, urban subsidence and urban infrastructure deformation.

Although the SAR technique based on multi-temporal characteristics has been successfully applied to building damage evaluation, it has limitations in rough qualitative evaluation of only damage states of affected buildings. Furthermore, due to its inherent limitations, InSAR's effectiveness in detecting the deformation from north to south is limited.

Therefore, the above issues need to be addressed urgently.

SUMMARY OF INVENTION

Object of the present invention: A first object of the present invention is to provide a method for evaluating post-earthquake damage of building groups based on InSAR, allowing for rapid evaluation of the post-earthquake damage.

A second object of the present invention is to provide a system for evaluating post-earthquake damage of building groups based on InSAR.

Technical solutions: To achieve the above object, the present invention discloses a method for evaluating post-earthquake damage of building groups based on interferometric synthetic aperture radar InSAR, including the steps of:

(1) determining an investigation region, acquiring pre- and post-earthquake radar images of a corresponding district, and acquiring radar datasets included in the radar images;
(2) acquiring a radar line-of-sight (LOS)-direction deformation map of the investigation region by processing the pre- and post-earthquake radar images using a two-pass differential InSAR (D-InSAR) method;
(3) acquiring a deformation in a main earthquake direction by decomposing an LOS-direction deformation;
(4) drawing a deformation classification map of buildings using the acquired deformation in the main earthquake direction in combination with position data of the buildings, and dividing the buildings into different damage levels;
(5) acquiring pre- and post-earthquake optical remote sensing images of the investigation region, and locating post-earthquake collapsed buildings;
(6) locating the collapsed buildings in the deformation classification map, comparing the optical remote sensing images with the deformation classification map, and locating exact positions of the collapsed buildings in the deformation classification map; and
(7) evaluating post-earthquake damage of the buildings, and evaluating post-earthquake damage of each of the buildings based on the positions of the collapsed buildings and the deformation classification map.

In step (1), the investigation region requiring evaluation of the post-earthquake damage of the building groups is determined, the pre- and post-earthquake radar images of the investigation region are acquired using a satellite or an aircraft, and the datasets included in the radar images are acquired.

Preferably, in step (2), the pre- and post-earthquake radar images are processed using the D-InSAR, LOS-direction deformation information of the investigation region is extracted from D-InSAR processing results, the radar LOS-direction deformation map of the investigation region is acquired, and the two-pass D-InSAR method comprises the specific steps of:

(2.1) simulating a topographic phase using an external digital elevation model DEM, and then, subtracting the simulated topographic phase from a differential interferometric phase to generate a differential interferogram;
(2.2) removing interferences of an atmospheric phase using a Goldstein filtering method;
(2.3) considering observation data from multiple angles of view, and integrating radar data from different angles of view;
(2.4) reducing an influence of a flat earth effect using satellite orbit information;
(2.5) processing a complex terrain and occluded regions using a phase unwrapping method;
(2.6) expanding and transforming the phases to acquire deformation data of the investigation region;
(2.7) performing geocoding using an SRTM3 DEM to convert original radar image data into pixel positions in a geographic coordinate system; and
(2.8) extracting deformation information of the investigation region in a radar LOS direction, to acquire the radar LOS-direction deformation map of the investigation region.

Moreover, in step (3), a specific relationship formula between a deformation $d_{los}$ of the investigation region in the radar LOS direction and a three-dimensional deformation $(d_1, d_2, d_u)$ of the investigation region is as follows:

$$d_{los} = [d_u, d_1, d_2] \begin{bmatrix} \cos\theta \\ -\sin\theta \cos\partial \\ \sin\theta \sin\partial \end{bmatrix},$$

in which $d_{los}$ represents the deformation of the investigation region in the radar LOS direction, $d_1$ represents the deformation in the main earthquake direction, $d_u$ represents a deformation in a vertical direction, $\theta$ represents a radar angle of incidence, and a represents an angle between a horizontal LOS projection and the main earthquake direction;

supposing that an earthquake only causes the deformation $d_1$, the deformation in the LOS direction and the deformation $d_1$ in the main earthquake direction can be converted by the following formulas:

$$d_{los} = d_1 \sin\theta \cos\partial$$

and $$d_1 = \frac{d_{los}}{\sin\theta \cos\partial}.$$

Further, in step (5), the pre- and post-earthquake optical remote sensing images of the investigation region are collected and then visually interpreted to locate the post-earthquake collapsed buildings.

The present invention discloses a system for evaluating post-earthquake damage of building groups based on InSAR. The system includes:

a radar image acquisition module for determining an investigation region, acquiring pre- and post-earthquake radar images of a corresponding district, and acquiring radar datasets included in the radar images;

a deformation map acquisition module for acquiring a radar line-of-sight (LOS)-direction deformation map of the investigation region by processing the pre- and post-earthquake radar images using a two-pass differential InSAR (D-InSAR) method;

a main-direction deformation acquisition module for acquiring a deformation in a main earthquake direction by decomposing an LOS-direction deformation;

a deformation map drawing module for drawing a deformation classification map of buildings using the acquired deformation in the main earthquake direction in combination with position data of the buildings, and dividing the buildings into different damage levels;

a collapsed building locating module for acquiring pre- and post-earthquake optical remote sensing images of the investigation region, and locating post-earthquake collapsed buildings;

a collapsed building comparison module for locating the collapsed buildings in the deformation classification map, comparing the optical remote sensing images with the deformation classification map, and locating exact positions of the collapsed buildings in the deformation classification map; and a loss evaluation module for evaluating post-earthquake damage of the buildings, and evaluating post-earthquake damage of each of the buildings based on the positions of the collapsed buildings and the deformation classification map.

In the radar image acquisition module, the investigation region requiring evaluation of the post-earthquake damage of the building groups is determined, the pre- and post-earthquake radar images of the investigation region are acquired using a satellite or an aircraft, and the datasets included in the radar images are acquired.

Preferably, in the deformation acquisition module, the pre- and post-earthquake radar images are processed using the D-InSAR, LOS-direction deformation information of the investigation region is extracted from D-InSAR processing results, the radar LOS-direction deformation map of the investigation region is acquired, and the two-pass D-InSAR method is executed as follows:

simulating a topographic phase using an external digital elevation model DEM, and then, subtracting the simulated topographic phase from a differential interferometric phase to generate a differential interferogram;

removing interferences of an atmospheric phase using a Goldstein filtering method;

considering observation data from multiple angles of view, and integrating radar data from different angles of view;

reducing an influence of a flat earth effect using satellite orbit information;

processing a complex terrain and occluded regions using a phase unwrapping method;

expanding and transforming the phases to acquire deformation data of the investigation region;

performing geocoding using an SRTM3 DEM to convert original radar image data into pixel positions in a geographic coordinate system; and extracting deformation information of the investigation region in a radar LOS direction, to acquire the radar LOS-direction deformation map of the investigation region.

Moreover, in the main-direction deformation acquisition module, a specific relationship formula between a deformation $d_{los}$ of the investigation region in the radar LOS direction and a three-dimensional deformation ($d_1$, $d_2$, $d_u$) of the investigation region is as follows:

$$d_{los} = [d_u, d_1, d_2] \begin{bmatrix} \cos\theta \\ -\sin\theta \cos\partial \\ \sin\theta \sin\partial \end{bmatrix},$$

in which $d_{los}$ represents the deformation of the investigation region in the radar LOS direction, $d_1$ represents the deformation in the main earthquake direction, $d_u$ represents a deformation in a vertical direction, $\theta$ represents a radar angle of incidence, and a represents an angle between a horizontal LOS projection and the main earthquake direction;

supposing that an earthquake only causes the deformation $d_1$, the deformation in the LOS direction and the deformation $d_1$ in the main earthquake direction can be converted by the following formulas:

$$d_{los} = d_1 \sin\theta \cos\partial$$

and $$d_1 = \frac{d_{los}}{\sin\theta \cos\partial}.$$

Further, in the collapsed building locating module, the pre- and post-earthquake optical remote sensing images of the investigation region are collected and then visually interpreted to locate the post-earthquake collapsed buildings.

Advantageous effects: Compared with the prior art, the present invention has the following significant advantages: the present invention is directed at urban building groups and improves the accuracy and efficiency of an evaluation process by integrating InSAR and the optical remote sensing images; the present invention allows for rapid evaluation of damage of urban building groups in earthquake-stricken regions by acquiring the extensive deformation field of a building combination using the InSAR technique and then visually interpreting the optical remote sensing images in the regions with significant deformation; the present invention allows for monitoring without being affected by factors such as clouds, fog and solar radiation, and is suitable for any weather condition; and the present invention allows for acquisition of the deformation field of the investigation region in a short time (1-2 days) and conversion of expensive post-disaster loss evaluation into low-cost and efficiency evaluation, providing support for establishing post-disaster rescue plans and reducing further loss.

DESCRIPTION OF EMBODIMENTS

The technical solutions of the present invention will be further illustrated below in conjunction with the accompanying drawings.

Embodiment 1

Figure 1:
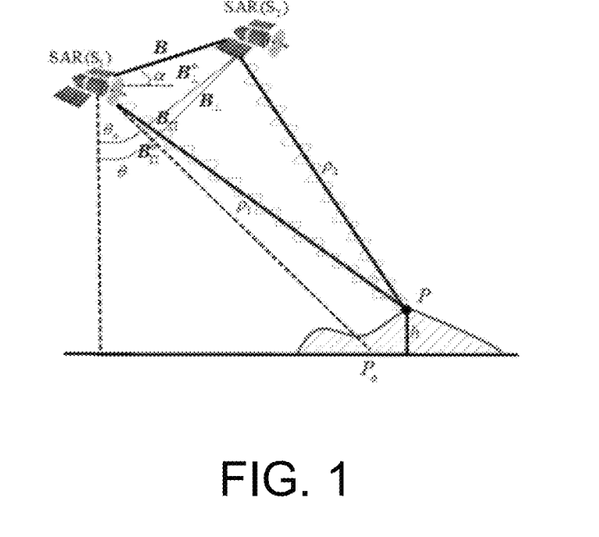
FIG. 1 is a diagram showing the principle of a D-InSAR technique according to the present invention.
Figure 3:
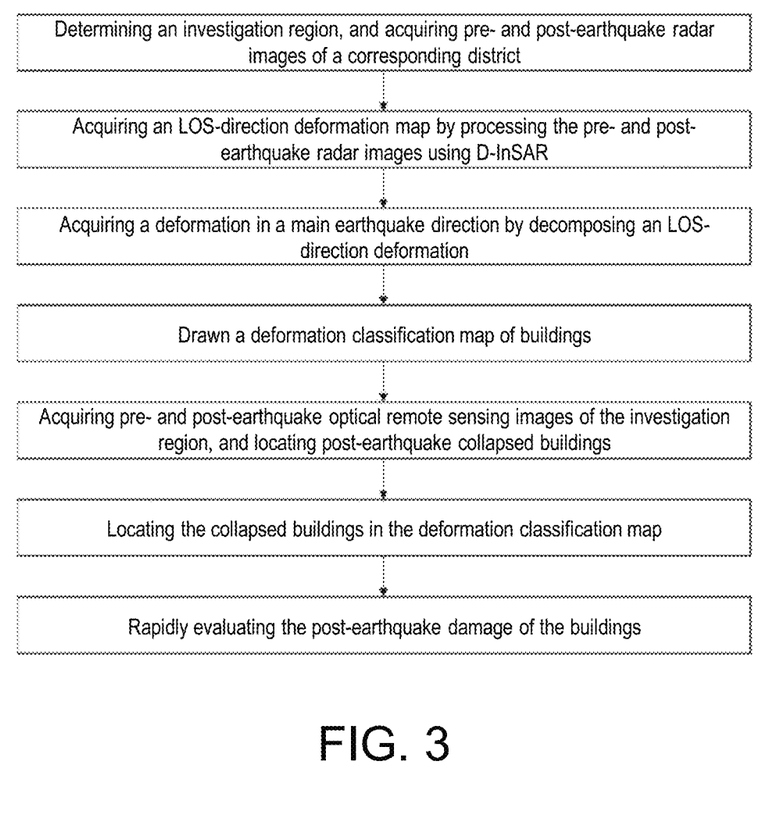
FIG. 3 is a flowchart of the implementation of the present invention.

InSAR covers an area of more than 1000 square kilometers, and is able to identify seriously affected districts on a large scale. As shown in FIG. 1 and FIG. 3, the method for evaluating post-earthquake damage of building groups based on InSAR includes the steps as follows.
(1) An investigation region is determined, pre- and post-earthquake radar images of a corresponding district are acquired, and radar datasets included in the radar images are acquired. Specifically, the investigation region requiring evaluation of the post-earthquake damage of the building groups is determined, the pre- and post-earthquake radar images of the investigation region are acquired using a satellite or an aircraft, and the datasets included in the radar images are acquired.

Figure 4:
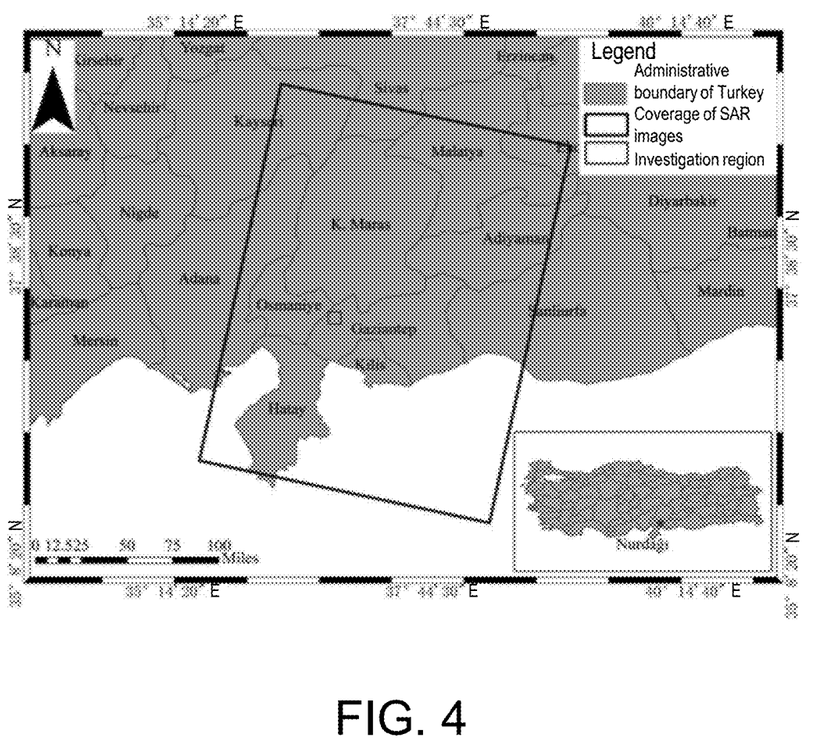
FIG. 4 is a schematic diagram of an investigation region for Turkish deformation monitoring and an SAR data processing range according to the present invention.

On Feb. 6, 2023, a major earthquake struck southern Turkey. Hence, Nurdağı situated in Gaziantep province in southern Turkey was selected as the investigation region. As shown in FIG. 4, an SAR processed region was represented by a dark-shade rectangle, while the investigation region was represented by a light-shade rectangle. A region of the light-shade rectangle was selected for monitoring using the InSAR technique.

C-band SAR data sourced from the sentinel-1A satellite of the European Space Agency was used as the main data source for the investigation. This data included an ascending pass covering the earthquake-stricken regions of Turkey, and in order to cover all the earthquake-stricken regions, two-scene data was selected from the same pass and processed. Also, SRTM3 was combined to derive a pre- and post-earthquake deformation field. The details of the radar datasets used are shown in Table 1. During D-InSAR processing, a pre-event image was taken as a primary image, and a post-event image was taken as a secondary image.

TABLE 1

| Parameters of pre- and post-earthquake Sentinel-1A satellite images of Turkey in 2023 | | | | | |
|---|---|---|---|---|---|
| Interference pair | Acquisition time | Orbit | Scene | Flight azimuth angle/° | Angle of incidence/° |
| Primary image | Jan. 29, 2023 | 14 | 114, 119 | −166.73 | 33.82 |
| Secondary image | Feb., 10, 2023 | 14 | 114, 119 | −166.73 | 33.82 |

(2) A radar LOS-direction deformation map of the investigation region is acquired by processing the pre- and post-earthquake radar images using a two-pass D-InSAR method. Specifically, the pre- and post-earthquake radar images are processed using the D-InSAR, LOS-direction deformation information of the investigation region is extracted from D-InSAR processing results, and the radar LOS-direction deformation map of the investigation region is acquired. In the present invention, Sentinel-1A SLC images are evaluated using two-pass differential interferometry, a topographic phase is simulated using an accurate external DEM, and then, the simulated topographic phase is subtracted from a differential interferometric phase to generate a differential interferogram. However, the differential interferometric phase includes components such as flat earth effect, deformation signals, atmosphere and noise. To address this issue, accurate orbit information is used to reduce the flat earth effect, an appropriate filtering method is used to remove the atmosphere phase, and phase expansion is carried out. Subsequently, the expanded phase is transformed to acquire the deformation data, which are geocoded using an SRTM3 DEM and then converted into a common mapping coordinate system.

Figure 5:
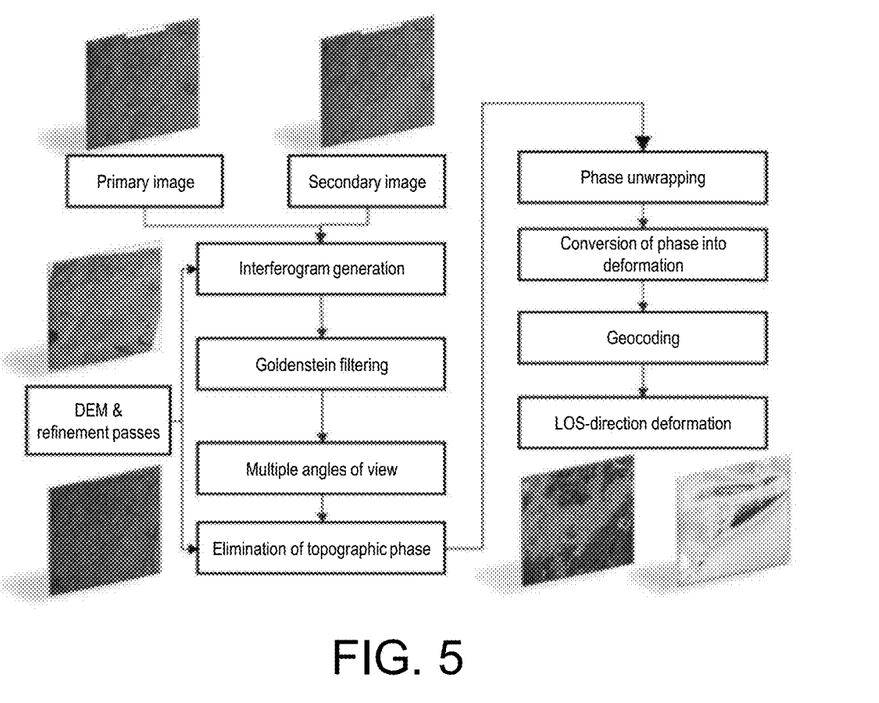
FIG. 5 is a schematic diagram of a processing process of a two-pass D-InSAR method according to the present invention.
Figure 6:
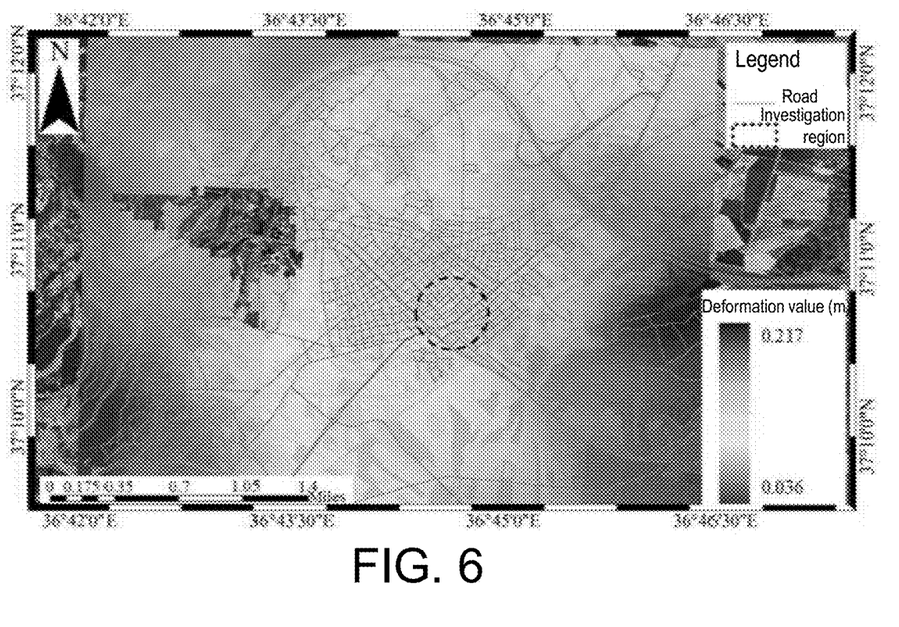
FIG. 6 is an LOS-direction deformation graph over the Nurdağı district according to the present invention.

As shown in FIG. 5, the two-pass D-InSAR method includes the following specific steps:
(2.1) simulating a topographic phase using an external digital elevation model DEM, and then, subtracting the simulated topographic phase from a differential interferometric phase to generate a differential interferogram;

(2.2) removing interferences of an atmospheric phase using a Goldstein filtering method;

(2.3) acquiring observation data from multiple angles of view and integrating radar data from different angles of view, whereby the spatial resolution is increased, and the occlusion and phase instability caused by different angles of view are reduced by integrating the data from multiple angles of view;

(2.4) reducing an influence of a flat earth effect using satellite orbit information;

(2.5) processing a complex terrain and occluded regions using a phase unwrapping method;

(2.6) expanding and transforming the phases to acquire deformation data of the investigation region;

(2.7) performing geocoding using an SRTM3 DEM to convert original radar image data into pixel positions in a geographic coordinate system, which ensures the spatial consistency and accuracy of the terrain and deformation data; and (2.8) extracting deformation information of the investigation region in a radar LOS direction, to acquire the radar LOS-direction deformation map of the investigation region. The acquired LOS-direction deformation of Nurdaği district is shown in FIG. 6.

Figure 2:
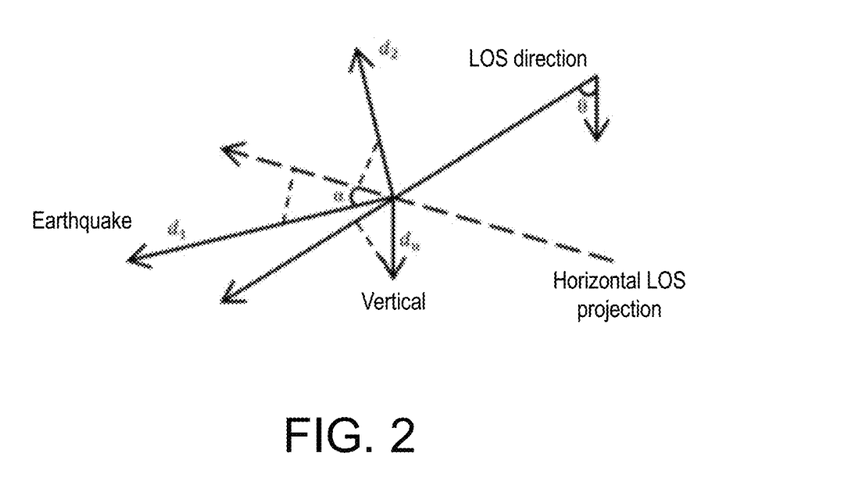
FIG. 2 is a diagram showing the decomposition of an LOS-direction deformation according to the present invention.

(3) The LOS-direction deformation is decomposed to acquire a deformation in a main earthquake direction. As shown in FIG. 2, a specific relationship formula between a deformation $d_{los}$ of the investigation region in the radar LOS direction and a three-dimensional deformation $(d_1, d_2, d_u)$ of the investigation region is as follows:

$$d_{los} = [d_u, d_1, d_2] \begin{bmatrix} \cos\theta \\ -\sin\theta\cos\partial \\ \sin\theta\sin\partial \end{bmatrix},$$

in which $d_{los}$ represents the deformation of the investigation region in the radar LOS direction, $d_1$ represents the deformation in the main earthquake direction, $d_u$ represents a deformation in a vertical direction, $\theta$ represents a radar angle of incidence, and $a$ represents an angle between a horizontal LOS projection and the main earthquake direction.

Supposing that an earthquake only causes the deformation $d_1$, the deformation in the LOS direction and the deformation $d_1$ in the main earthquake direction can be converted by the following formulas:

$$d_{los} = d_1 \sin\theta \cos\partial$$

and $$d_1 = \frac{d_{los}}{\sin\theta \cos\partial}.$$

According the reports from several intermediation media, Carlo Doglioni, director of the National Institute of Geophysics and Volcanology of Italy, pointed out that the most recent major earthquake in Turkey exactly occurred at the junction of three tectonic plates: Anatolia, Arabia and Africa. This earthquake caused the entire Arabian plate to move to the northeast by 3 m, and the Anatolia plate to move to the southwest by 3 m. Considering the above information, the present invention assumes that the structure located in Nurdaği investigation region on the Anatolia plate mainly undergoes a deformation in the southwest direction, while ignoring the factor of structural subsidence. By substituting the relevant data (for example, radar angle of incidence) from Table 2 into the formula, the deformation value $d_1$ in the main earthquake direction may be described by the following expression: $d_1 = 2.13 d_{los}$.

(4) A deformation classification map of buildings is drawn using the acquired deformation in the main earthquake direction in combination with position data of the buildings, and the buildings are divided into different damage levels.

Figure 7:
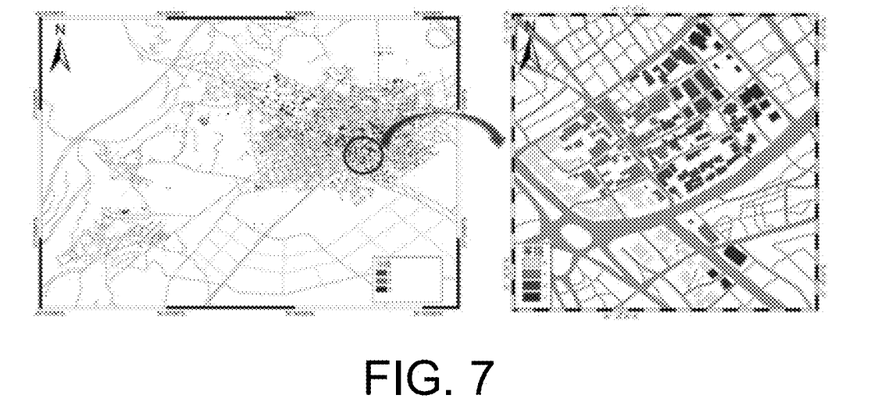
FIG. 7 is a deformation classification map over the Nurdağı district according to the present invention.

According to the acquired deformation value in the main earthquake direction, the deformations of Nurdaği buildings in the main earthquake direction were divided into several levels. The deformations of local regions in Nurdaği in the main earthquake direction, as shown in FIG. 7, were divided into three levels, namely, below 0.25 m, 0.25-0.3 m, and above 0.3 m. Among regions with the deformation level 3, a region (investigation region) was selected for more detailed evaluation of the deformation of buildings. In this region, the deformation values were mainly in the range of 300-312 mm; and based on the deformation values, the buildings in the investigation region were divided into four levels, namely, below 300 mm, 300-306 mm, 306-312 mm, and above 312 mm.

Figure 8:
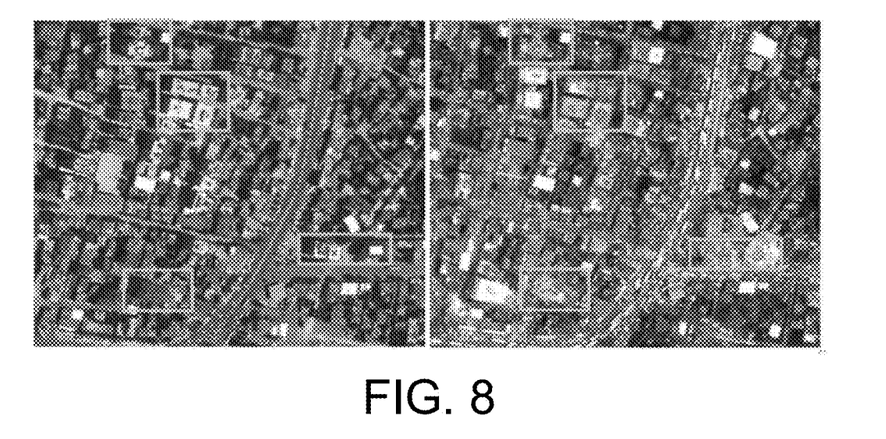
FIG. 8 is a schematic diagram showing locating of damaged buildings based on optical remote sensing images according to the present invention.

(5) Pre- and post-earthquake optical remote sensing images of the investigation region are acquired, and post-earthquake collapsed buildings are located. Specifically, the pre- and post-earthquake optical remote sensing images of the investigation region are collected and then visually interpreted to locate the post-earthquake collapsed buildings. As shown in FIG. 8, it depicts the pre- and post-earthquake optical remote sensing images of the buildings in a selected district of Nurdaği, with the boxes indicating the affected buildings in the optical remote sensing images.

Figure 9:
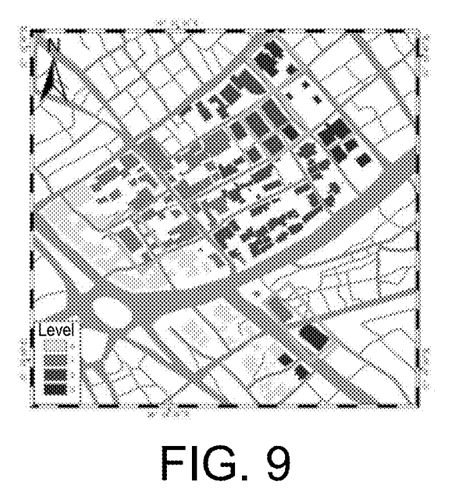
FIG. 9 is a schematic diagram showing locating of the damaged buildings in the deformation classification map according to the present invention.

(6) The collapsed buildings are located in the deformation classification map, the optical remote sensing images are compared with the deformation classification map, and the exact positions of the collapsed buildings are located in the deformation classification map. i.e., marking corresponding positions on the deformation classification map. The deformation classification map with the collapsed buildings marked is shown in FIG. 9.

(7) The post-earthquake damage of the buildings is evaluated, and the post-earthquake damage condition of each of the buildings is evaluated based on the positions of the collapsed buildings and the deformation classification map. The deformation in the northern region is comparatively greater than in the southern region. With the increase of the distance from the hypocenter, the deformation level gradually decreases in a radial pattern along the southeast direction. This pattern suggests that buildings close to the hypocenter undergo greater deformation, which is in line with the common regularity of earthquake vibrations. Classifying the buildings in the earthquake-stricken regions is helpful to enhance the understanding of the damage caused by earthquakes, provides an important basis for the subsequent rescue and reconstruction. The method provided by the present invention allows for acquisition of the deformation field of the investigation region in a short time (1-2 days) and conversion of expensive post-disaster loss evaluation into low-cost and efficient post-earthquake damage evaluation, providing support for establishing post-disaster rescue plans and reducing further loss.

Embodiment 2

InSAR covers an area of more than 1000 square kilometers, and is able to identify seriously affected districts on a large scale. The present invention discloses a system for evaluating post-earthquake damage of building groups based on InSAR. The system includes:

a radar image acquisition module for determining an investigation region, acquiring pre- and post-earthquake radar images of a corresponding district, and acquiring radar datasets comprised in the radar images, in which the investigation region requiring evaluation of the post-earthquake damage of the building groups is determined, the pre- and post-earthquake radar images of the investigation region are acquired using a satellite or an aircraft, and the datasets included in the radar images are acquired;

a deformation map acquisition module for acquiring a radar line-of-sight LOS-direction deformation map of the investigation region by processing the pre- and post-earthquake radar images using a two-pass D-InSAR method, in which the pre- and post-earthquake radar images are processed using the D-InSAR, LOS-direction deformation information of the investigation region is extracted from D-InSAR processing results, the radar LOS-direction deformation map of the investigation region is acquired, and the two-pass D-InSAR method is executed as follows:

simulating a topographic phase using an external digital elevation model DEM, and then, subtracting the simulated topographic phase from a differential interferometric phase to generate a differential interferogram;

removing interferences of an atmospheric phase using a Goldstein filtering method;

considering observation data from multiple angles of view, and integrating radar data from different angles of view;

reducing an influence of a flat earth effect using satellite orbit information;

processing a complex terrain and occluded regions using a phase unwrapping method;

expanding and transforming the phases to acquire deformation data of the investigation region;

performing geocoding using an SRTM3 DEM to convert original radar image data into pixel positions in a geographic coordinate system; and extracting deformation information of the investigation region in a radar LOS direction, to acquire the radar LOS-direction deformation map of the investigation region, in which a specific relationship formula between a deformation $d_{los}$ of the investigation region in the radar LOS direction and a three-dimensional deformation $(d_1, d_2, d_u)$ of the investigation region is as follows:

$$d_{los} = [d_u, d_1, d_2] \begin{bmatrix} \cos\theta \\ -\sin\theta \cos\partial \\ \sin\theta \sin\partial \end{bmatrix},$$

in which $d_{los}$ represents the deformation of the investigation region in the radar LOS direction, $d_1$ represents the deformation in the main earthquake direction, $d_u$ represents a deformation in a vertical direction, $\theta$ represents a radar angle of incidence, and $a$ represents an angle between a horizontal LOS projection and the main earthquake direction;

supposing that an earthquake only causes the deformation $d_1$, the deformation in the LOS direction and the deformation $d_1$ in the main earthquake direction can be converted by the following formulas:

$$d_{los} = d_1 \sin\theta \cos\partial$$

and $$d_1 = \frac{d_{los}}{\sin\theta \cos\partial};$$

a main-direction deformation acquisition module for acquiring a deformation in a main earthquake direction by decomposing an LOS-direction deformation;

a deformation map drawing module for drawing a deformation classification map of buildings using the acquired deformation in the main earthquake direction in combination with position data of the buildings, and dividing the buildings into different damage levels;

a collapsed building locating module for acquiring pre- and post-earthquake optical remote sensing images of the investigation region, and locating post-earthquake collapsed buildings, in which the pre- and post-earthquake optical remote sensing images of the investigation region are collected and then visually interpreted to locate the post-earthquake collapsed buildings;

a collapsed building comparison module for locating the collapsed buildings in the deformation classification map, comparing the optical remote sensing images with the deformation classification map, and locating exact positions of the collapsed buildings in the deformation classification map; and a loss evaluation module for evaluating post-earthquake damage of the buildings, and evaluating post-earthquake damage of each of the buildings based on the positions of the collapsed buildings and the deformation classification map.

The present invention provides a method for evaluating post-earthquake damage of building groups based on InSAR. The description above only provides preferred embodiments of the present invention. It should be noted that for those of ordinary skills in the art, various improvements and modifications can be made without departing from the principle of the present invention, and these improvements and modifications shall be construed as falling within the protection scope of the present invention. Any component that is not specified in this embodiment can be implemented by the prior art.

What is claimed is:

1. A method for evaluating post-earthquake damage of building groups based on InSAR (interferometric synthetic aperture radar), comprising the steps of:

(1) determining an investigation region, acquiring pre- and post-earthquake radar images of a corresponding district, and acquiring radar datasets comprised in the radar images;

(2) acquiring a radar line-of-sight LOS-direction deformation map of the investigation region by processing the pre- and post-earthquake radar images using a two-pass differential InSAR (D-InSAR) method;

(3) acquiring a deformation in a main earthquake direction by decomposing an LOS-direction deformation;

wherein in step (3), a specific relationship formula between a deformation $d_{los}$ of the investigation region in the radar LOS direction and a three-dimensional deformation ($d_1$, $d_2$, $d_u$) of the investigation region is as follows:

$$d_{los} = [d_u, d_1, d_2] \begin{bmatrix} \cos\theta \\ -\sin\theta\cos\partial \\ \sin\theta\sin\partial \end{bmatrix},$$

wherein $d_{los}$ represents the deformation of the investigation region in the radar LOS direction, $d_1$ represents the deformation in the main earthquake direction, $d_u$ represents a deformation in a vertical direction, $\theta$ represents a radar angle of incidence, and $\alpha$ represents an angle between a horizontal LOS projection and the main earthquake direction;

supposing that an earthquake only causes the deformation $d_1$, the deformation in the LOS direction and the deformation $d_1$ in the main earthquake direction can be converted by the following formulas:

$$d_{los} = d_1 \sin\theta \cos\partial$$

and $$d_1 = \frac{d_{los}}{\sin\theta\cos\partial},$$

(4) drawing a deformation classification map of buildings using the acquired deformation in the main earthquake direction in combination with position data of the buildings, and dividing the buildings into different damage levels;

(5) acquiring pre- and post-earthquake optical remote sensing images of the investigation region, and locating post-earthquake collapsed buildings;

(6) locating the collapsed buildings in the deformation classification map, comparing the optical remote sensing images with the deformation classification map, and locating exact positions of the collapsed buildings in the deformation classification map; and (7) evaluating post-earthquake damage of the buildings, and evaluating the post-earthquake damage of each of the buildings based on the positions of the collapsed buildings and the deformation classification map.

2. The method for evaluating post-earthquake damage of building groups based on InSAR according to claim 1, wherein in step (1), the investigation region requiring evaluation of the post-earthquake damage of the building groups is determined, the pre- and post-earthquake radar images of the investigation region are acquired using a satellite or an aircraft, and the datasets comprised in the radar images are acquired.

3. The method for evaluating post-earthquake damage of building groups based on InSAR according to claim 2, wherein in step (2), the pre- and post-earthquake radar images are processed using the D-InSAR, LOS-direction deformation information of the investigation region is extracted from D-InSAR processing results, the radar LOS-direction deformation map of the investigation region is acquired, and the two-pass D-InSAR method comprises the specific steps of:

(2.1) simulating a topographic phase using an external digital elevation model DEM, and then, subtracting the simulated topographic phase from a differential interferometric phase to generate a differential interferogram;

(2.2) removing interferences of an atmospheric phase using a Goldstein filtering method;

(2.3) considering observation data from multiple angles of view, and integrating radar data from different angles of view;

(2.4) reducing an influence of a flat earth effect using satellite orbit information;

(2.5) processing a complex terrain and occluded regions using a phase unwrapping method;

(2.6) expanding and transforming the phases to acquire deformation data of the investigation region;

(2.7) performing geocoding using an SRTM3 DEM to convert original radar image data into pixel positions in a geographic coordinate system; and (2.8) extracting deformation information of the investigation region in a radar LOS direction, to acquire the radar LOS-direction deformation map of the investigation region.

4. The method for evaluating post-earthquake damage of building groups based on InSAR according to claim 3, wherein in step (5), the pre- and post-earthquake optical remote sensing images of the investigation region are collected and then visually interpreted to locate the post-earthquake collapsed buildings.

5. A system for evaluating post-earthquake damage of building groups based on InSAR (interferometric synthetic aperture radar), comprising:

a radar image acquisition module for determining an investigation region, acquiring pre- and post-earthquake radar images of a corresponding district, and acquiring radar datasets comprised in the radar images;

a deformation map acquisition module for acquiring a radar line-of-sight LOS-direction deformation map of the investigation region by processing the pre- and post-earthquake radar images using a two-pass differential InSAR (D-InSAR) method;

a main-direction deformation acquisition module for acquiring a deformation in a main earthquake direction by decomposing an LOS-direction deformation;

wherein in the main-direction deformation acquisition module, a specific relationship formula between a deformation $d_{los}$ of the investigation region in the radar LOS direction and a three-dimensional deformation ($d_1$, $d_2$, $d_u$) of the investigation region is as follows:

$$d_{los} = [d_u, d_1, d_2] \begin{bmatrix} \cos\theta \\ -\sin\theta\cos\partial \\ \sin\theta\sin\partial \end{bmatrix},$$

wherein $d_{los}$ represents the deformation of the investigation region in the radar LOS direction, $d_1$ represents the deformation in the main earthquake direction, $d_u$ represents a deformation in a vertical direction, $\theta$ represents a radar angle of incidence, and $\alpha$ represents an angle between a horizontal LOS projection and the main earthquake direction;

supposing that an earthquake only causes the deformation $d_1$, the deformation in the LOS direction and the deformation $d_1$ in the main earthquake direction can be converted by the following formulas:

$$d_{los} = d_1 \sin\theta \cos\partial$$

and $$d_1 = \frac{d_{los}}{\sin\theta \cos\partial},$$

a deformation map drawing module for drawing a deformation classification map of buildings using the acquired deformation in the main earthquake direction in combination with position data of the buildings, and dividing the buildings into different damage levels;

a collapsed building locating module for acquiring pre- and post-earthquake optical remote sensing images of the investigation region, and locating post-earthquake collapsed buildings;

a collapsed building comparison module for locating the collapsed buildings in the deformation classification map, comparing the optical remote sensing images with the deformation classification map, and locating exact positions of the collapsed buildings in the deformation classification map; and a loss evaluation module for evaluating post-earthquake damage of the buildings, and evaluating the post-earthquake damage of each of the buildings based on the positions of the collapsed buildings and the deformation classification map.

6. The system for evaluating post-earthquake damage of building groups based on InSAR according to claim 5, wherein in the radar image acquisition module, the investigation region requiring evaluation of the post-earthquake damage of the building groups is determined, the pre- and post-earthquake radar images of the investigation region are acquired using a satellite or an aircraft, and the datasets comprised in the radar images are acquired.

7. The system for evaluating post-earthquake damage of building groups based on InSAR according to claim 6, wherein in the deformation acquisition module, the pre- and post-earthquake radar images are processed using the D-InSAR, LOS-direction deformation information of the investigation region is extracted from D-InSAR processing results, the radar LOS-direction deformation map of the investigation region is acquired, and the two-pass D-InSAR method is executed as follows:

simulating a topographic phase using an external digital elevation model DEM, and then, subtracting the simulated topographic phase from a differential interferometric phase to generate a differential interferogram;

removing interferences of an atmospheric phase using a Goldstein filtering method;

considering observation data from multiple angles of view, and integrating radar data from different angles of view;

reducing an influence of a flat earth effect using satellite orbit information;

processing a complex terrain and occluded regions using a phase unwrapping method;

expanding and transforming the phases to acquire deformation data of the investigation region;

performing geocoding using an SRTM3 DEM to convert original radar image data into pixel positions in a geographic coordinate system; and extracting deformation information of the investigation region in a radar LOS direction, to acquire the radar LOS-direction deformation map of the investigation region.

8. The system for evaluating post-earthquake damage of building groups based on InSAR according to claim 7, wherein in the collapsed building locating module, the pre- and post-earthquake optical remote sensing images of the investigation region are collected and then visually interpreted to locate the post-earthquake collapsed buildings.

\* \* \* \* \*